(12) United States Patent
Sicurelli, III et al.

(10) Patent No.: US 11,388,104 B2
(45) Date of Patent: **\*Jul. 12, 2022**

(54) SYSTEMS AND METHODS FOR PROVIDING PREDICTED WEB PAGE RESOURCES

(71) Applicant: Meta Platforms, Inc., Menlo Park, CA (US)

(72) Inventors: Robert James Sicurelli, III, Brooklyn, NY (US); Jack F. Gill, Brooklyn, NY (US); Bhuwan Bhushan Khattar, London (GB); Artur Galiullin, Austin, TX (US); Nicholas John Gavalas, New York, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/119,673

(22) Filed: Dec. 11, 2020

(65) Prior Publication Data

US 2021/0099399 A1    Apr. 1, 2021

Related U.S. Application Data

(63) Continuation of application No. 15/716,190, filed on Sep. 26, 2017, now Pat. No. 10,911,370.

(51) Int. Cl.
*H04L 47/765* (2022.01)
*G06N 7/00* (2006.01)

(52) U.S. Cl.
CPC .......... *H04L 47/765* (2013.01); *G06N 7/005* (2013.01)

(58) Field of Classification Search
CPC .............................. H04L 47/765; G06N 7/005
See application file for complete search history.

(56) References Cited

U.S. PATENT DOCUMENTS

| | | |
|---|---|---|
| 6,282,542 B1 | 8/2001 | Carneal et al. |
| 6,480,839 B1 | 11/2002 | Whittington et al. |
| 6,725,456 B1 | 4/2004 | Bruno et al. |
| 7,308,497 B2 | 12/2007 | Louviere et al. |
| 7,917,625 B1 | 3/2011 | Cook |
| 8,776,021 B1 | 7/2014 | Suttle et al. |
| 8,966,446 B1 | 2/2015 | Amacker et al. |
| 10,394,796 B1 | 8/2019 | Dang et al. |
| 2004/0243704 A1 | 12/2004 | Botelho et al. |
| 2005/0159921 A1 | 7/2005 | Louviere et al. |
| 2007/0011073 A1 | 1/2007 | Gardner et al. |
| 2007/0083650 A1 | 4/2007 | Collomb et al. |
| 2007/0198937 A1 | 8/2007 | Paris |

(Continued)

OTHER PUBLICATIONS

Merriam_Webster, "predict", 2019 (Year: 2019).
Merriam-Webster, "predict", 2020 (Year: 2020).

*Primary Examiner* — Sm A Rahman
(74) *Attorney, Agent, or Firm* — Sheppard Mullin Richter & Hampton

(57) ABSTRACT

Systems, methods, and non-transitory computer-readable media can receive a web page request associated with a user ID from a client computing device. A set of gatekeeper conditions is determined based on the user ID. A set of predicted resources is determined based on the set of gatekeeper conditions. An initial package of resources is transmitted to the client computing device in response to the web page request. The initial package of resources comprises the set of predicted resources.

20 Claims, 8 Drawing Sheets

(56) References Cited

U.S. PATENT DOCUMENTS

| | | |
|---|---|---|
| 2007/0277235 A1 | 11/2007 | Barrett et al. |
| 2008/0170776 A1* | 7/2008 | Albertson ............... H04L 63/08 |
| | | 382/154 |
| 2008/0172488 A1 | 7/2008 | Jawahar et al. |
| 2008/0243631 A1 | 10/2008 | Kane et al. |
| 2009/0019527 A1 | 1/2009 | Winslow |
| 2009/0288169 A1 | 11/2009 | Petta et al. |
| 2010/0076847 A1 | 3/2010 | Heller |
| 2010/0100419 A1 | 4/2010 | Natoli et al. |
| 2010/0153704 A1* | 6/2010 | Winslow ................. H04L 63/10 |
| | | 713/153 |
| 2010/0191856 A1 | 7/2010 | Gupta et al. |
| 2012/0102433 A1 | 4/2012 | Falkenburg |
| 2012/0140620 A1 | 6/2012 | Hogan et al. |
| 2012/0210435 A1 | 8/2012 | Niemela |
| 2014/0019443 A1 | 1/2014 | Golshan |
| 2014/0095324 A1 | 4/2014 | Cabral et al. |
| 2015/0112880 A1 | 4/2015 | Blaylock, IV et al. |
| 2016/0050129 A1 | 2/2016 | Hoyne |
| 2016/0105449 A1 | 4/2016 | Montagnon et al. |
| 2016/0292681 A1 | 10/2016 | Bryson et al. |
| 2017/0237824 A1 | 8/2017 | Vignali |
| 2017/0359433 A1 | 12/2017 | Gorjiara et al. |
| 2018/0007202 A1 | 1/2018 | Batlle |
| 2018/0181484 A1 | 6/2018 | Jambu et al. |
| 2019/0007519 A1 | 1/2019 | Doran et al. |

\* cited by examiner

SYSTEMS AND METHODS FOR PROVIDING PREDICTED WEB PAGE RESOURCES

CROSS-REFERENCE TO RELATED APPLICATIONS

This application is a continuation of U.S. patent application Ser. No. 15/716,190, filed on Sep. 26, 2017 entitled "SYSTEMS AND METHODS FOR PROVIDING PREDICTED WEB PAGE RESOURCES", which is incorporated herein by reference.

FIELD OF THE INVENTION

The present technology relates to the field of web page transmission. More particularly, the present technology relates to systems and methods for web page transmission based on predicted web page resources.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system. In certain scenarios, a user can access the social networking system by using a computing device to load a web page (or web site).

SUMMARY

Various embodiments of the present disclosure can include systems, methods, and non-transitory computer readable media configured to receive a web page request associated with a user ID from a client computing device. A set of gatekeeper conditions is determined based on the user ID. A set of predicted resources is determined based on the set of gatekeeper conditions. An initial package of resources is transmitted to the client computing device in response to the web page request. The initial package of resources comprises the set of predicted resources.

In an embodiment, a set of gatekeeper condition-resource associations is generated. The set of gatekeeper condition-resource associations associate one or more gatekeeper conditions with one or more resources. The set of predicted resources is determined based on the set of gatekeeper conditions and the set of gatekeeper condition-resource associations.

In an embodiment, a request for an additional resource is received from the computing device. The set of gatekeeper condition-resource associations is updated based on the request for the additional resource.

In an embodiment, a resource counter associated with the additional resource is incremented in response to the request for the additional resource.

In an embodiment, one or more gatekeeper condition-resource pair counters are incremented in response to the request for the additional resource.

In an embodiment, the updating the set of gatekeeper condition-resource associations is performed based on the incrementing the resource counter and the incrementing the one or more gatekeeper condition-resource pair counters.

In an embodiment, the updating the set of gatekeeper condition-resource associations comprises calculating a conditional probability indicative of a probability that a particular resource will be requested given a particular gatekeeper condition.

In an embodiment, the updating the set of gatekeeper condition-resource associations comprises determining that a first conditional probability relating a first resource with a first gatekeeper condition satisfies a conditional probability threshold.

In an embodiment, the updating the set of gatekeeper condition-resource associations comprises associating the first resource with the first gatekeeper condition based on the determining that the first conditional probability satisfies the conditional probability threshold.

In an embodiment, the initial package of resources further comprises one or more high frequency resources.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
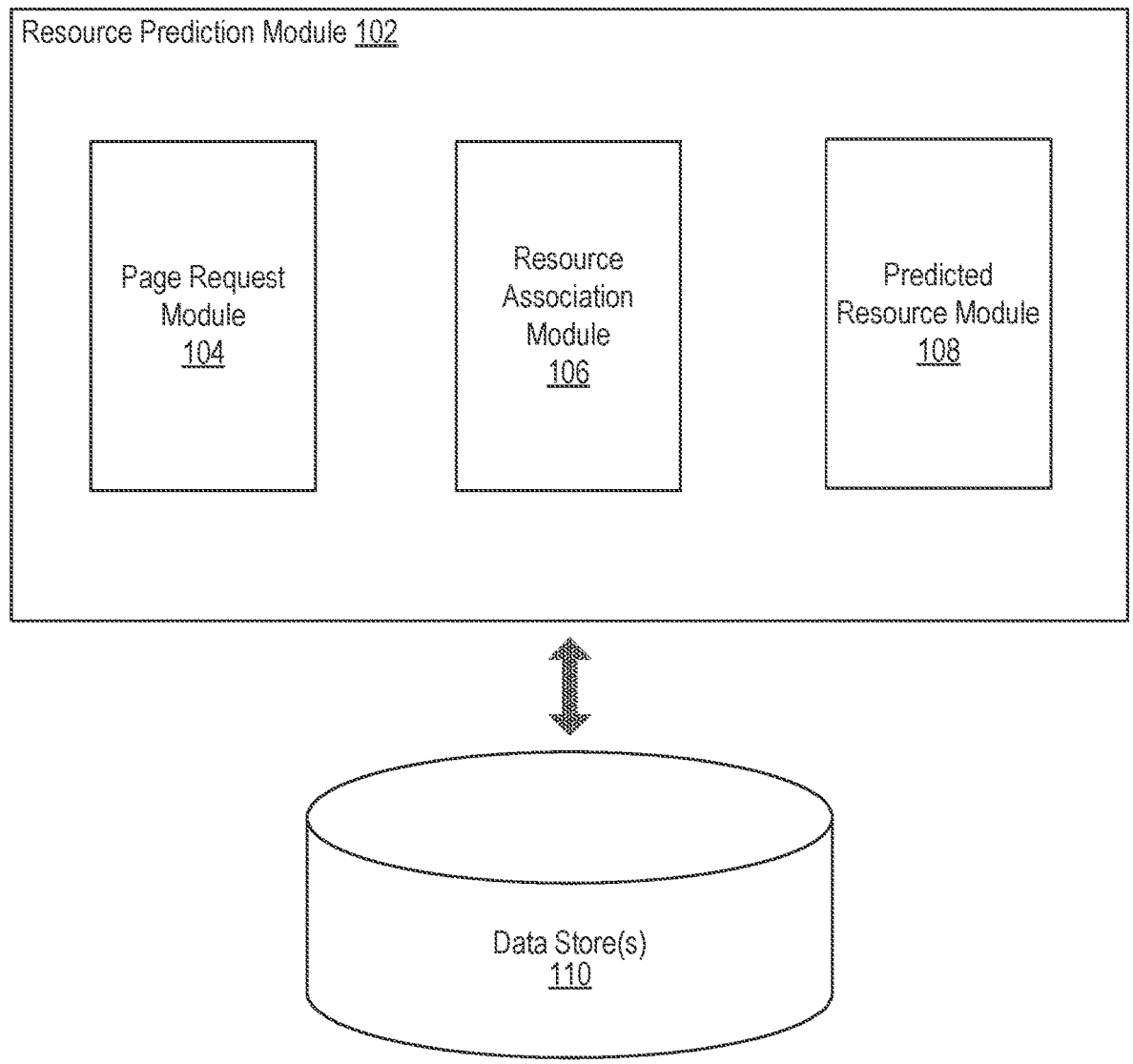
FIG. 1 illustrates an example system including a resource prediction module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Predicted Web Page Resources

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system. In certain scenarios, a user can access the social networking system by using a computing device to load a web page (or web site).

When a user attempts to access a web page, such as a web page on a social networking system, a client computing device used by the user can transmit a request for the web page. The request can be received at one or more web servers. For example, the one or more web servers can be associated with the social networking system. The one or more web servers can respond to the web page request by transmitting one or more resources that can be utilized by the client computing device to load the web page. Resources can include, for example, HTML, Javascript, and/or CSS files or modules.

Under conventional approaches, when one or more web servers receive a web page request from a client computing device, the one or more web servers can respond by transmitting to the client computing device an initial set of resources. The initial set of resources can include one or more resources that can be used by the client computing device to load at least a portion of a web page. However, it can be difficult to determine exactly what resources a client computing device will need in order to fully load a web page. This may be the case, for example, if a web page has various dynamic elements that differ depending on the user accessing the web page. For example, on a social networking system, different users may be presented with different content or features, such that a first user having access to a first set of content or features may require a first set of resources to load a web page, while a second user having access to a different set of content or features may require a different set of resources to load the web page.

One reason that users of a social networking system may be provided with access to different content or features may be due to various experiments being conducted by the social networking system. For example, a particular experiment may include a certain subsets of users, such that the subset of users may receive access to particular content or features based on their inclusion in the particular experiment. As such, users that are included in the experiment may require particular resources in order to load the content or features associated with the experiment. Conversely, other users that are not included in the experiment may not require the resources that are needed to load the aforementioned content and/or features.

Since the exact set of resources required for a web page cannot always be immediately determined, the initial set of resources transmitted to a client computing device may not represent a complete set of resources required to load a web page. As such, as the client computing device loads the web page using the initial set of resources, it may be determined that additional resources are required in order to fully load the web page. The client computing device can transmit one or more requests for the additional resources. In response, the one or more web servers can retrieve and transmit the additional resources to the client computing device. However, this back-and-forth communication between the client computing device and the one or more web servers can significantly increase the time that it takes to load a web page. Slow web page load times can result in a negative user experience when interacting with a web page.

An improved approach rooted in computer technology overcomes the foregoing and other disadvantages associated with conventional approaches specifically arising in the realm of computer technology. In general, a request for a web page (i.e., a web page request) can be received from a client computing device. The request can be associated with a particular user, for example, by being associated with a user ID. A determination can be made as to whether or not the user is a participant in any experiments. In certain embodiments, each experiment of a set of experiments can be associated with a gatekeeper function. The user ID associated with the web page request can be provided as an input to each gatekeeper function of a set of gatekeeper functions. Each gatekeeper function can output a result. For example, if there are three gatekeeper functions, each associated with its own experiment, each of the three gatekeeper functions can be provided with the user ID associated with the web page request. Each gatekeeper function can return either a "pass" result indicating that the user ID is a participant in an experiment associated with the gatekeeper function, or a "fail" result indicating that the user ID is not a participant in the experiment associated with the gatekeeper function.

Each gatekeeper function-result pair can define a gatekeeper condition. In an embodiment in which each gatekeeper function can result in either a "pass" result or a "fail" result, each gatekeeper function can define two gatekeeper conditions: gatekeeper_pass and gatekeeper_fail. Each gatekeeper condition can be associated with one or more resources. For example, a first gatekeeper function, GK_A, can have two gatekeeper conditions: GK_A_pass or GK_A_fail. The gatekeeper condition GK_A_pass may be associated with a first set of resources, while the gatekeeper condition GK_A_fail, may be associated with a second set of resources. This may be indicative of the fact that if a user is included in an experiment associated with the gatekeeper function GK_A, resulting in the gatekeeper condition GK_A_pass, the user may have access to certain features. Conversely, if the user is not included in the experiment associated with the gatekeeper function GK_A, resulting in the gatekeeper condition GK_A_fail, the user may not have access to those features. As such, each gatekeeper condition will require different resources to load the different sets of features.

As mentioned above, a user ID associated with a web page request can be processed through a set of gatekeeper functions, yielding a set of gatekeeper conditions. For example, if there are four gatekeeper functions, GK_A, GK_B, GK_C, and GK_D, a user ID can be provided to each of the four gatekeeper functions to yield a set of gatekeeper conditions, such as: [GK_A_pass, GK_B_pass, GK_C_fail, GK_D_pass]. A set of predicted resources can be identified based on the set of gatekeeper conditions. In certain embodiments, the set of predicted resources can comprise an aggregation of resources associated with gatekeeper conditions in the set of gatekeeper conditions. The set of predicted resources can be provided to the client computing device as part of an initial package in response to the web page request. In certain embodiments, the initial package can be understood as a set of resources transmitted to a client computing device in response to an initial web page request. In certain embodiments, the initial package of resources is transmitted to the client computing device before the client computing device transmits any requests for additional resources. By providing a set of predicted resources in the initial package, the number of follow-up requests for additional resources required to load a web page can be minimized. In various embodiments, associations between gatekeeper conditions and resources can be predictively determined based on historical data. Associations between gatekeeper conditions and resources can be periodically updated based on additional resources requested by client computing devices after receiving an initial package. Additional details about the disclosed technologies will be provided herein.

FIG. 1 illustrates an example system 100 including a resource prediction module 102, according to an embodiment of the present disclosure. The resource prediction module 102 can be configured to receive a request for a web page (i.e., a web page request) from a client computing device. The request can be associated with a particular user through, for example, a particular user ID associated with the user. The resource prediction module 102 can determine whether or not the user is a participant in any experiments. In certain embodiments, the resource prediction module 102 can make this determination by inputting a user ID associated with a web page request through a set of gatekeeper functions. Each gatekeeper function can be associated with a particular experiment. When a user ID is provided to the set of gatekeeper functions, each gatekeeper function can output a result. In certain embodiments, each gatekeeper function can return either a "pass" result indicating that the user ID is a participant in the experiment associated with the gatekeeper function, or a "fail" result indicating that the user ID is not a participant in the experiment associated with the gatekeeper function. Each gatekeeper function-result pair can define a gatekeeper condition. As such, by processing the user ID through the set of gatekeeper functions, the resource prediction module 102 can determine a set of gatekeeper conditions based on the user ID associated with the web page request.

The resource prediction module 102 can determine and maintain a set of associations between gatekeeper conditions and resources. For example, if a set of gatekeeper functions includes two gatekeeper functions, GK_A and GK_B, then four gatekeeper conditions are possible: GK_A_pass, GK_A_fail, GK_B_pass, and GK_B_fail. Each of these four gatekeeper conditions can be determined to be correlated and/or associated with a particular set of resources. In certain scenarios, certain gatekeeper conditions may be associated with one or more resources while other gatekeeper conditions may not be associated with any resources. The resource prediction module 102 can be configured to determine associations between gatekeeper conditions and resources based on historical web page data. For example, if web page requests resulting in the gatekeeper condition GK_A_fail consistently result in an additional request for a particular additional resource, Resource X, it can be determined that Resource X is associated with the gatekeeper condition GK_A_fail. The resource prediction module 102 can be configured to periodically update associations between gatekeeper conditions and resources so that more recent web page data can periodically be incorporated into gatekeeper condition-resource associations.

As discussed above, when a web page request associated with a user ID is received, a set of gatekeeper conditions can be determined for the web page request based on the user ID. The resource prediction module 102 can identify a set of predicted resources based on resources associated with the gatekeeper conditions contained within the set of gatekeeper conditions. The resource prediction module 102 can provide the set of predicted resources to the client computing device as part of an initial package in response to the client computing device's web page request. The resource prediction module 102 can also be configured to keep records of any additional resources requested by the client computing device subsequent to receiving the initial package. The resource prediction module 102 can update associations between resources and gatekeeper conditions based on additional resources requested by client computing devices.

As shown in the example of FIG. 1, the resource prediction module 102 can include a page request module 104, a resource association module 106, and a predicted resource module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details. In various embodiments, one or more of the functionalities described in connection with the resource prediction module 102 can be implemented in any suitable combinations.

In some embodiments, the resource prediction module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the resource prediction module 102 can be implemented, in part or in whole, as software running on one or more computing devices or systems, such as on a user or client computing device. For example, the resource prediction module 102, or at least a portion thereof, can be implemented as or within an application (e.g., app), a program, or an applet, etc., running on a user computing device or a client computing system, such as the user device 610 of FIG. 6. In another example, the resource prediction module 102, or at least a portion thereof, can be implemented using one or more computing devices or systems that include one or more servers, such as network servers or cloud servers. In some instances, the resource prediction module 102 can, in part or in whole, be implemented within or configured to operate in conjunction with a social networking system (or service), such as the social networking system 630 of FIG. 6. It should be understood that there can be many variations or other possibilities.

The resource prediction module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the resource prediction module 102. For example, the data store 110 can store web page resources, historical web page data, a set of gatekeeper condition counters, a set of resource counters, a set of gatekeeper condition-resource pair counters, gatekeeper condition-resource association information, and the like. It is contemplated that there can be many variations or other possibilities.

The page request module 104 can be configured to receive a web page request from a client computing device. In certain embodiments, a web page request can be associated with a particular user. For example, the web page request may be associated with a particular user ID.

The page request module 104 can also be configured to determine a set of gatekeeper conditions based on the user ID associated with the web page request. A web page associated with a web page request can be associated with a set of gatekeeper functions. The set of gatekeeper functions can include any suitable number of gatekeeper functions (e.g., one gatekeeper function, two gatekeeper functions, etc.). In certain embodiments, each gatekeeper function can be associated with a particular experiment being conducted by a web page provider (e.g., by a social networking system). The page request module 104 can provide the user ID as an input to each gatekeeper function of the set of gatekeeper functions to obtain a set of gatekeeper conditions. For example, consider an example scenario in which a set of gatekeeper functions has three gatekeeper functions: GK_A, GK_B, and GK_C. In this example scenario, six gatekeeper conditions are possible: GK_A_pass; GK_A_fail; GK_B_pass; GK_B_fail; GK_C_pass; and GK_C_fail. Then, consider a further example scenario in which a particular user, User A, is included in a first experiment associated with Gatekeeper GK_A, is not included in a second experiment associated with Gatekeeper GK_B, and is included in a third experiment associated with Gatekeeper GK_C. In this scenario, provision of User A's user ID to the set of gatekeeper functions would result in the following set of gatekeeper conditions: [GK_A_pass; GK_B_fail; GK_C_pass]. Although various example embodiments described herein will involve the use of gatekeeper functions and gatekeeper conditions, it should be understood that in various embodiments, any indicator of whether or not a user is included in an experiment can be used.

The resource association module 106 can be configured to determine associations between one or more gatekeeper conditions and one or more resources. In various embodiments, the resource association module 106 can determine associations between gatekeeper conditions and resources based on historical web page data. As described in greater detail herein, when a client computing device requests a particular web page, the client computing device can be provided with an initial package of resources. The client computing device can begin loading the web page based on the initial package of resources. However, during loading of the web page, if the client computing device determines that additional resources are required (i.e., resources not included in the initial package of resources), the client computing device can transmit one or more requests for the additional resources. A web server that receives a request for an additional resource can respond by retrieving the additional resource and transmitting it to the client computing device. The resource association module 106 can be configured to keep record of these requests for additional resources. These requests for additional resources represent potential inefficiencies, as they indicate resources that were not included in the initial package and required additional requests by a client computing device and additional transmissions from a web server.

In addition to tracking requests for additional resources, the resource association module 106 can also be configured to keep record of gatekeeper conditions associated with each web page request. By maintaining historical web page data, the resource association module 106 can be configured to identify relationships between resources and gatekeeper conditions. For example, if a gatekeeper condition GK_A_pass consistently results in an additional request for a Resource X, the resource association module 106 can determine that Resource X is likely associated with the gatekeeper condition GK_A_pass. Based on historical web page data, the resource association module 106 can determine a set of associations between gatekeeper conditions and resources. Certain gatekeeper conditions may have one or more associated resources, while other gatekeeper conditions may have none. The resource association module 106 is described in greater detail herein with reference to FIG. 2.

The predicted resource module 108 can be configured to identify a set of predicted resources for a web page request, and to transmit the set of predicted resources as part of an initial package sent to a client computing device in response to the web page request. As described above, when a web page request is received, a set of gatekeeper conditions can be determined for the web page request based on a user ID associated with the web page request. As was also introduced above, certain gatekeeper conditions in the set of gatekeeper conditions may be associated with one or more resources. The predicted resource module 108 can identify a set of predicted resources for a web page request by aggregating all resources associated with gatekeeper conditions contained in the set of gatekeeper conditions. The set of predicted resources can be transmitted to a client computing device as part of an initial package in response to the web page request. The predicted resource module 108 is described in greater detail herein with reference to FIG. 3.

Figure 2:
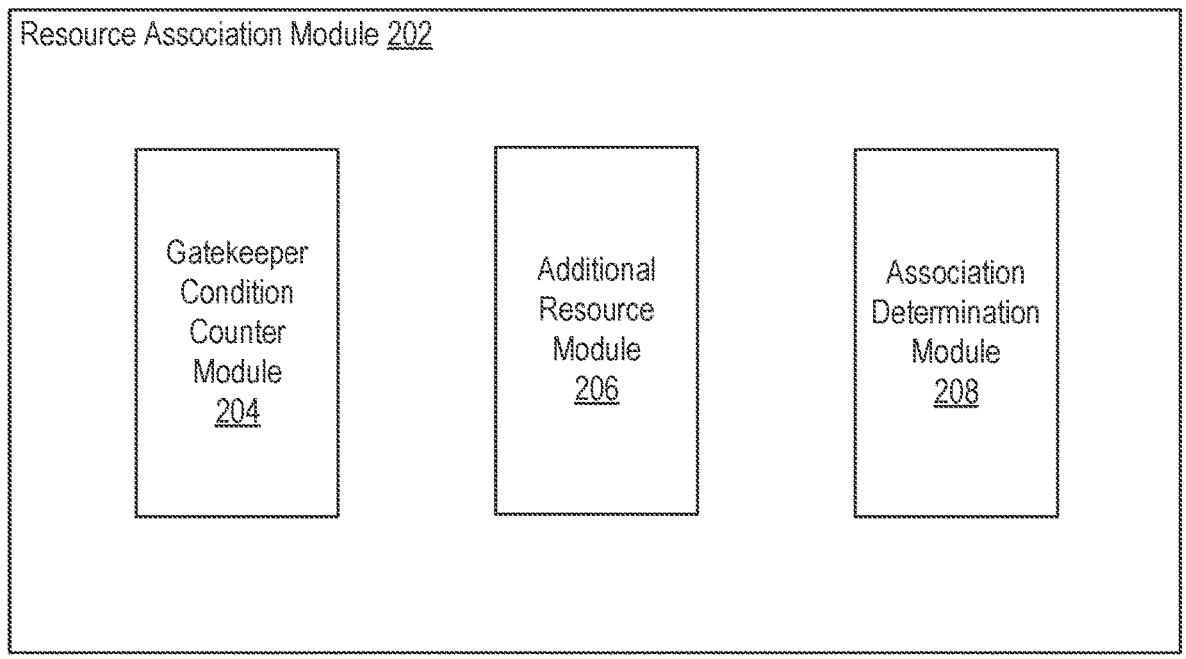
FIG. 2 illustrates an example resource association module, according to an embodiment of the present disclosure.

FIG. 2 illustrates an example resource association module 202 configured to determine associations between one or more gatekeeper conditions and one or more resources, according to an embodiment of the present disclosure. In some embodiments, the resource association module 106 of FIG. 1 can be implemented as the resource association module 202. As shown in the example of FIG. 2, the resource association module 202 can include a gatekeeper condition counter module 204, an additional resource module 206, and an association determination module 208.

The gatekeeper condition counter module 204 can be configured to maintain a set of gatekeeper condition counters. Each gatekeeper condition counter can be associated with a particular gatekeeper condition, and can be indicative of how many times the particular gatekeeper condition has occurred. As discussed above, when a web page request is received, a set of gatekeeper conditions can be determined for the web page request. For example, if a set of gatekeeper functions has three gatekeeper functions (e.g., GK_A, GK_B, GK_C), six gatekeeper conditions are possible (GK_A_pass, GK_A_fail, GK_B_pass, GK_B_fail, GK_C_pass, GK_C_fail). A set of gatekeeper conditions for a particular web page request will include three gatekeeper conditions (i.e., a pass or a fail for each gatekeeper function). The gatekeeper condition counter module 204 can be configured to maintain a gatekeeper condition counter for each possible gatekeeper condition. When a gatekeeper condition occurs for a particular web page request, the gatekeeper condition counter module 204 can increment the gatekeeper condition counter associated with the gatekeeper condition. In this way, the gatekeeper condition counter module 204 can maintain a running total of how many times each gatekeeper condition has occurred across all web page requests (e.g., for all time, or during a specified period of time).

The additional resource module 206 can be configured to receive notifications of any requests for additional resources, and to maintain a set of resource counters. Each resource counter can be indicative of how many times a particular resource has been requested as an additional resource. As discussed above, when a client computing device requests a particular web page, an initial package of resources can be transmitted to the client computing device. The client computing device can begin loading the web page based on the initial package of resources. However, if the client computing device determines that one or more additional resources are required, the client computing device can transmit one or more requests for the one or more additional resources. The additional resource module 206 can receive an indication that the client computing device has requested an additional resource, and can increment a resource counter associated with the additional resource. In this way, the additional resource module 206 can maintain a count of how many times each resource has been requested as an additional resource across all web page requests.

The additional resource module 206 can also be configured to maintain a set of gatekeeper condition-resource pair counters. Each gatekeeper condition-resource pair counter can indicate how many times a particular gatekeeper condition and a request for a particular additional resource have occurred together. For example, consider an example scenario in which there are three gatekeeper functions: GK_1, GK_2, and GK_3. A user, User A, requests a web page. It is determined that User A passes GK_1, fails GK_2, and passes GK_3. As such, the set of gatekeeper conditions for User A's web page request is as follows: [GK_1_pass; GK_2_fail; GK_3_pass]. User A's client computing device receives an initial package of resources for the web page. However, the client computing device determines that it must request three additional resources: Resource X, Resource Y, and Resource Z. Based on this web page request, the following gatekeeper condition and resource counters are incremented:

- a gatekeeper condition counter for GK_1_pass is incremented;
- a gatekeeper condition counter for GK_2_fail is incremented;
- a gatekeeper condition counter for GK_3_pass is incremented;
- a resource counter for Resource X is incremented;
- a resource counter for Resource Y is incremented; and
- a resource counter for Resource Z is incremented.

Furthermore, gatekeeper condition-resource pair counters are incremented for each resource/gatekeeper condition pair, i.e.:

[GK_1_pass, Resource X];
[GK_1_pass, Resource Y];
[GK_1_pass, Resource Z];
[GK_2_fail, Resource X];
[GK_2_fail, Resource Y];
[GK_2_fail, Resource Z];
[GK_3_pass, Resource X];
[GK_3_pass, Resource Y]; and
[GK_3_pass, Resource Z].

The association determination module 208 can be configured to determine associations between gatekeeper conditions and resources based on historical web page data. Historical web page data can include, for example, a set of gatekeeper condition counters, a set of resource counters, and/or a set of gatekeeper condition-resource pair counters. In certain embodiments, associations between gatekeeper conditions and resources can be determined based on a conditional probability calculation that relate a particular resource to a particular gatekeeper condition. For example, each conditional probability calculation can be a probability that a particular resource will be requested as an additional resource given that a particular gatekeeper condition is true. For example, a probability that a particular resource, Resource X, will be required given a particular gatekeeper condition, GK_1_pass, can be expressed as follows:

$$P(X|GK\_1\_pass) = P(GK\_1\_pass|X) * P(X) / P(GK\_1\_pass),$$

where $P(X|GK\_1\_pass)$ is the probability of Resource X being requested given gatekeeper condition GK_1_pass; $P(GK\_1\_pass|X)$ is the probability of gatekeeper condition GK_1_pass being true given that Resource X was requested as an additional resource; $P(X)$ is the probability of Resource X being requested as an additional resource; and $P(GK\_1\_pass)$ is the probability of the gatekeeper condition GK_1_pass being true. This probability calculation can be performed using the gatekeeper condition counters, resource counters, and gatekeeper condition-resource pair counters described above:

- $P(GK\_1\_pass|X)$ can be calculated as count(GK_1_pass)/count(X), i.e., the gatekeeper condition counter for GK_1_pass divided by the resource counter for Resource X;
- $P(X)$ can be calculated as count(X)/count(total), i.e., the resource counter for Resource X divided by the total sum of all resource counters; and
- $P(GK\_1\_pass)$ can be calculated as count(GK_1_pass)/(count(GK_1_pass)+count(GK_1_fail)), i.e., the gatekeeper condition counter for GK_1_pass divided by the sum of the gatekeeper condition counter for GK_1_pass and the gatekeeper condition counter for GK_1_fail.

By calculating conditional probabilities for each resource-gatekeeper condition pair, correlations can be determined between resources and gatekeeper conditions. For example, if a conditional probability for a particular resource given a particular gatekeeper condition exceeds a probability threshold (e.g., exceeds 90%), the association determination module 208 can associate the particular resource with the particular gatekeeper condition. In certain embodiments, conditional probabilities for each resource-gatekeeper condition pair can be periodically re-calculated. For example, conditional probabilities can be re-calculated every five minutes. In certain embodiments, conditional probabilities can be re-calculated based on the most recent data such that stale or irrelevant data is not used. For example, in certain embodiments, when a conditional probability is calculated, only data from the previous hour can be used, i.e., each counter only includes instances that occurred within the past hour. For example, each gatekeeper condition counter can include only instances of gatekeeper conditions that occurred within the past hour, or each resource counter can include only instances of additional resource requests that occurred within the past hour. In certain embodiments, each conditional probability can be calculated every five minutes based on the past hour's worth of counter data.

Figure 3:
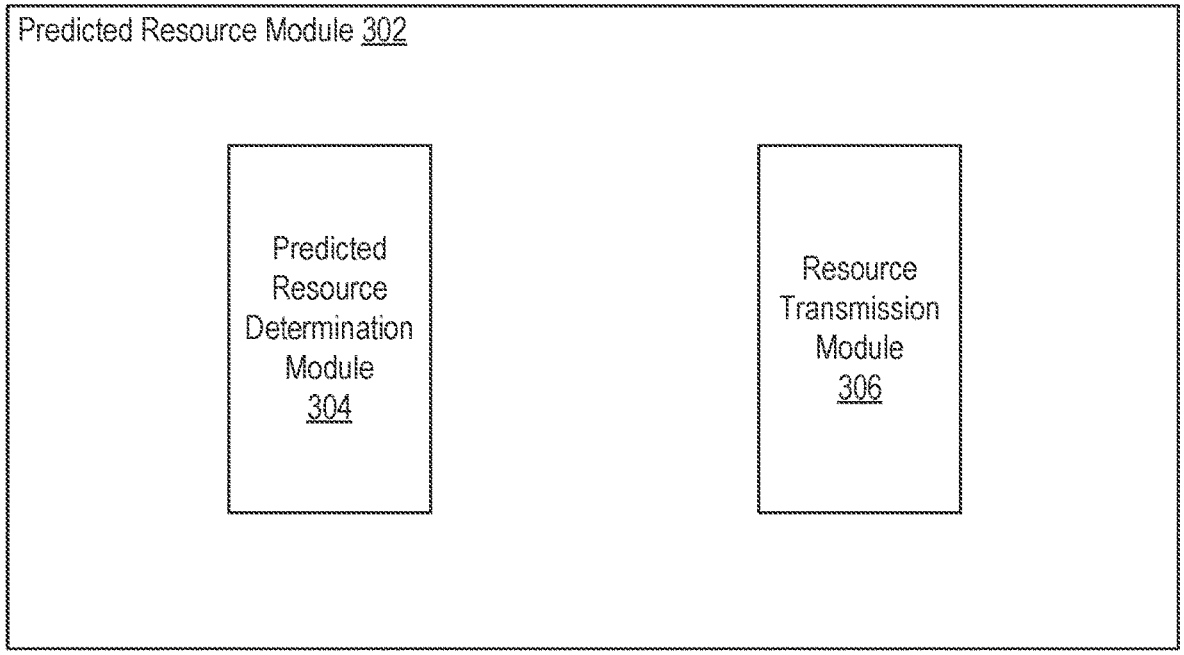
FIG. 3 illustrates an example predicted resource module, according to an embodiment of the present disclosure.

FIG. 3 illustrates an example predicted resource module 302 configured to identify a set of predicted resources for a web page request, and to transmit the set of predicted resources to a client computing device as part of an initial package in response to the web page request, according to an embodiment of the present disclosure. In some embodiments, the predicted resource module 108 of FIG. 1 can be implemented as the predicted resource module 302. As shown in the example of FIG. 3, the predicted resource module 302 can include a predicted resource determination module 304 and a resource transmission module 306.

The predicted resource determination module 304 can be configured to identify a set of predicted resources for a web page request. In certain embodiments, the set of predicted resources for a web page request can be determined based on a set of gatekeeper conditions determined for the web page request. As discussed above, when a web page request is received, a set of gatekeeper conditions can be determined based on a user ID associated with the web page request. As was also discussed above, each gatekeeper condition can be associated with zero or more resources. The predicted resource determination module 304 can identify a set of predicted resources for a web page request by aggregating all resources associated with the set of gatekeeper conditions determined for the web page request.

The resource transmission module 306 can be configured to transmit resources to a client computing device. In certain embodiments, the resource transmission module 306 can transmit an initial package of resources to a client computing device in response to a web page request received from the client computing device. In certain embodiments, the initial package of resources is transmitted in response to the web page request, and is not transmitted in response to any subsequent requests for additional resources from the client computing device. In certain embodiments, the initial package of resources can include a set of predicted resources, e.g., the set of predicted resources determined by the predicted resource determination module 304. Furthermore, in various embodiments, the initial package of resources can include other resources that are not in the set of predicted resources. For example, the initial package of resources can also include a set of high frequency resources associated with a web page. The set of high frequency resources can include one or more resources that have been determined to be required by all users or substantially all users that request a web page. For example, if all users accessing a social networking system web page are presented with the same header, then any resources required to load the header may be included in the set of high frequency resources.

Figure 4A:
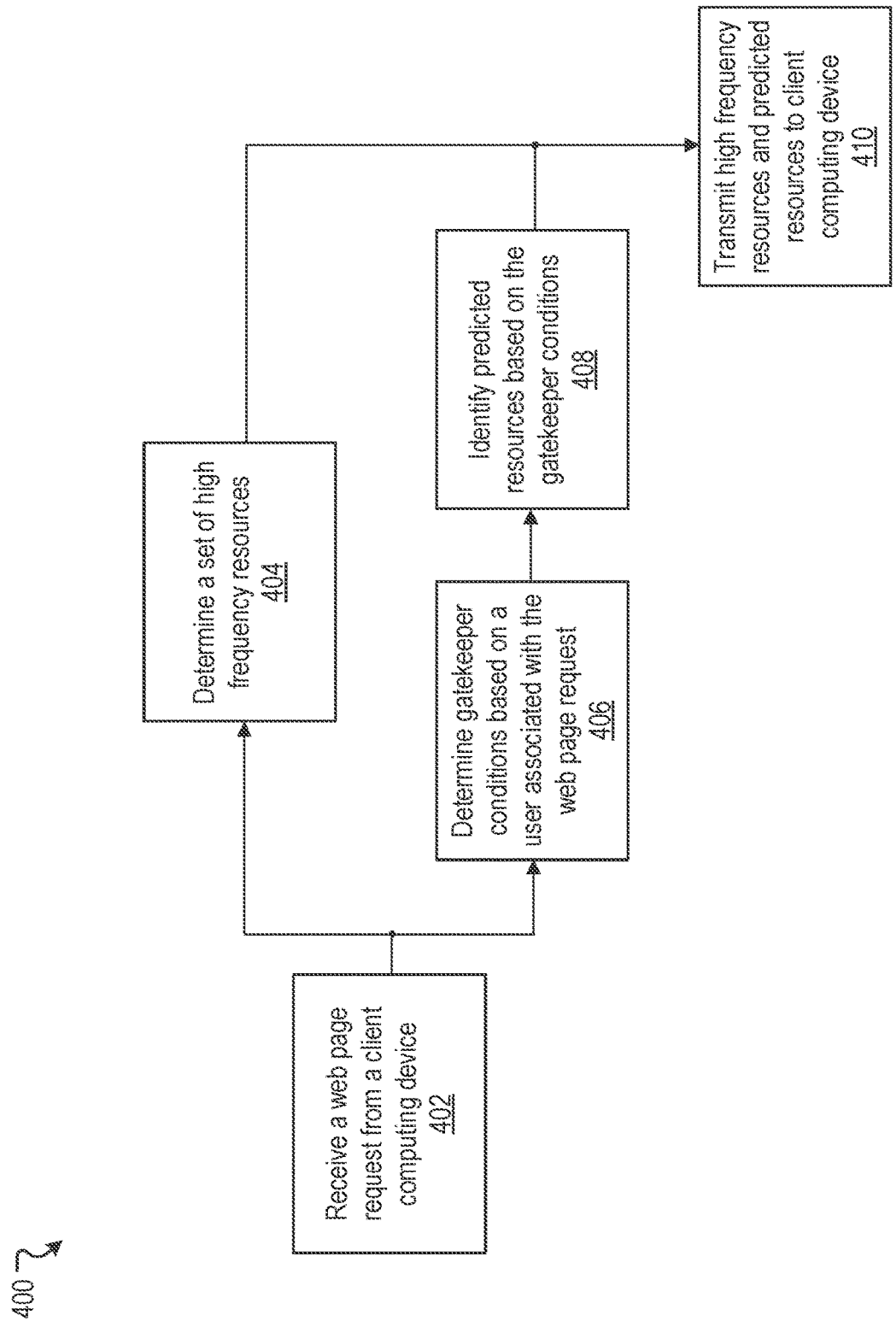
FIG. 4A illustrates an example functional block diagram associated with providing an initial package of resources, according to an embodiment of the present disclosure.

FIG. 4A illustrates an example functional block diagram 400 associated with providing an initial package of resources in response to a web page request in accordance with functionality of the resource prediction module 102, according to an embodiment of the present disclosure. At block 402, a web page request is received from a client computing device. At block 404, a set of high frequency resources is determined. At block 406, a set of gatekeeper conditions is determined based on a user associated with the web page request. At block 408, a set of predicted resources is identified based on the set of gatekeeper conditions. At block 410, the set of high frequency resources and the set of predicted resources are transmitted to the client computing device as part of an initial package of resources.

Figure 4B:
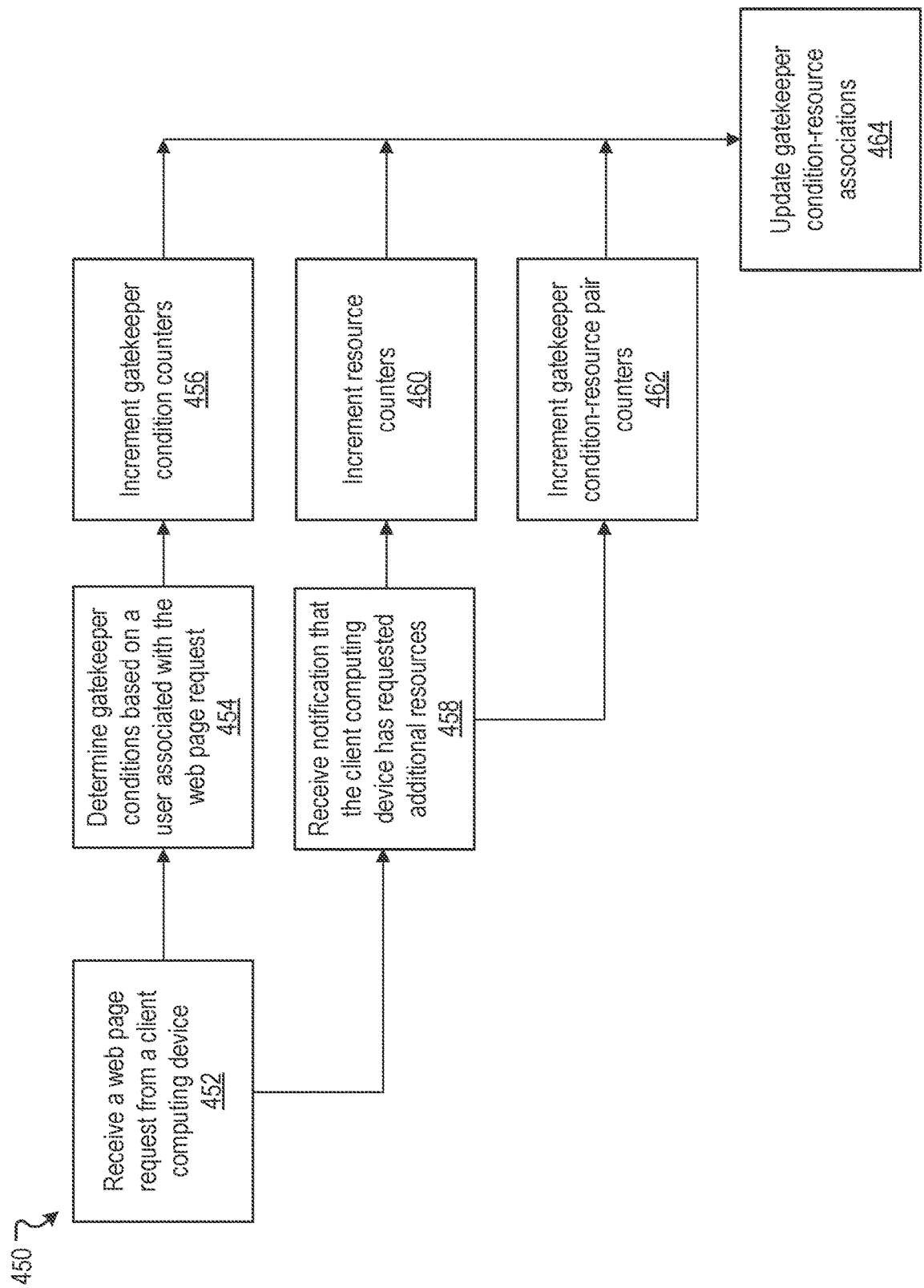
FIG. 4B illustrates an example functional block diagram associated with updating gatekeeper condition-resource associations, according to an embodiment of the present disclosure.

FIG. 4B illustrates an example functional block diagram 450 associated with updating a set of gatekeeper condition-resource associations in accordance with functionality of the resource prediction module 102, according to an embodiment of the present disclosure. At block 452, a web page request is received from a client computing device. At block 454, a set of gatekeeper conditions is determined based on a user associated with the web page request. At block 456, gatekeeper condition counters are incremented for each gatekeeper condition of the set of gatekeeper conditions. At block 458, a notification is received that the client computing device has requested a set of additional resources. At block 460, resource counters are incremented for each additional resource of the set of additional resources. At block 462, gatekeeper condition-resource pair counters are incremented for each gatekeeper condition-resource pair that includes a gatekeeper condition in the set of gatekeeper conditions and a resource in the set of additional resources. At block 464, gatekeeper condition-resource associations are updated based on the gatekeeper condition counters, the resource counters, and the gatekeeper condition-resource pair counters.

Figure 5:
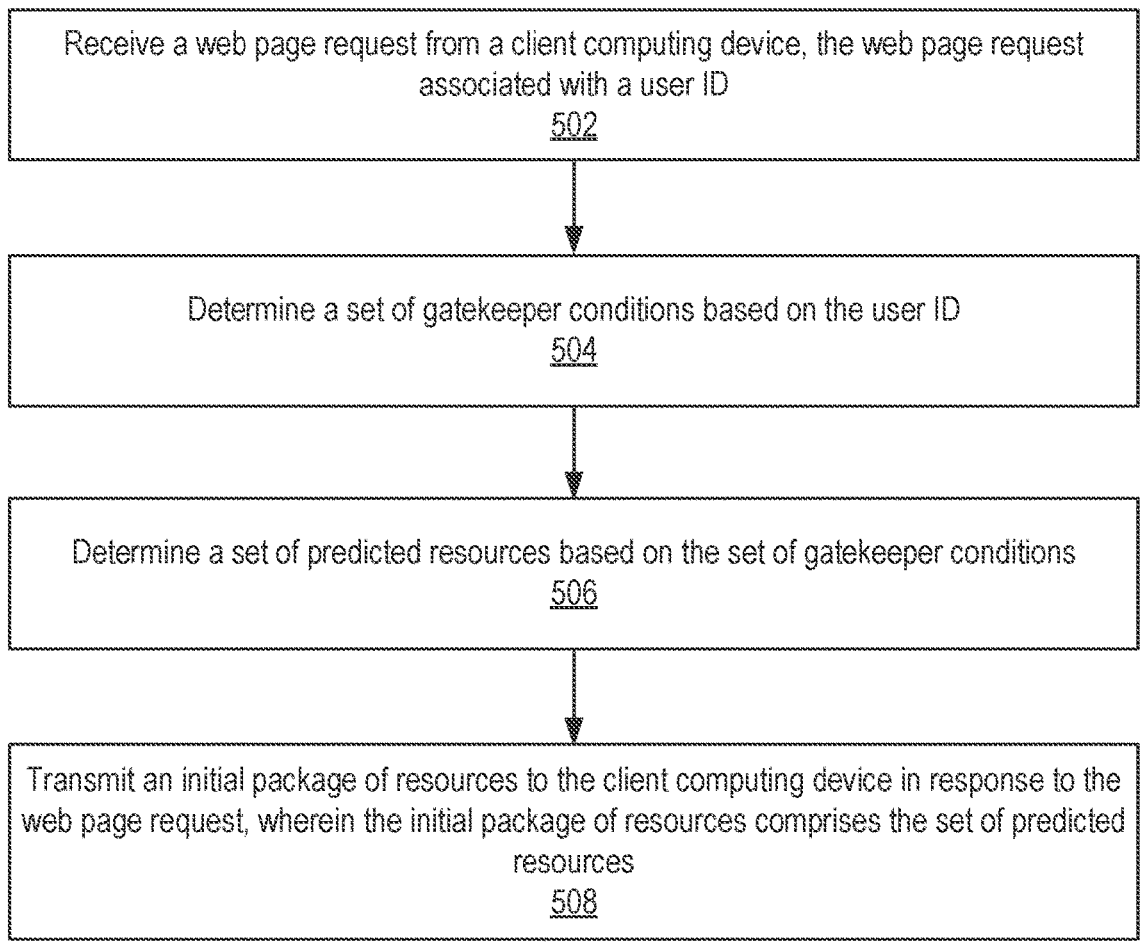
FIG. 5 illustrates an example method associated with transmitting a web page based on predicted resources, according to an embodiment of the present disclosure.

FIG. 5 illustrates an example method 500 associated with transmitting a web page based on predicted resources, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can receive a web page request from a client computing device, the web page request associated with a user ID. At block 504, the example method 500 can determine a set of gatekeeper conditions based on the user ID. At block 506, the example method 500 can determine a set of predicted resources based on the set of gatekeeper conditions. At block 508, the example method 500 can transmit an initial package of resources to the client computing device in response to the web page request, wherein the initial package of resources comprises the set of predicted resources.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
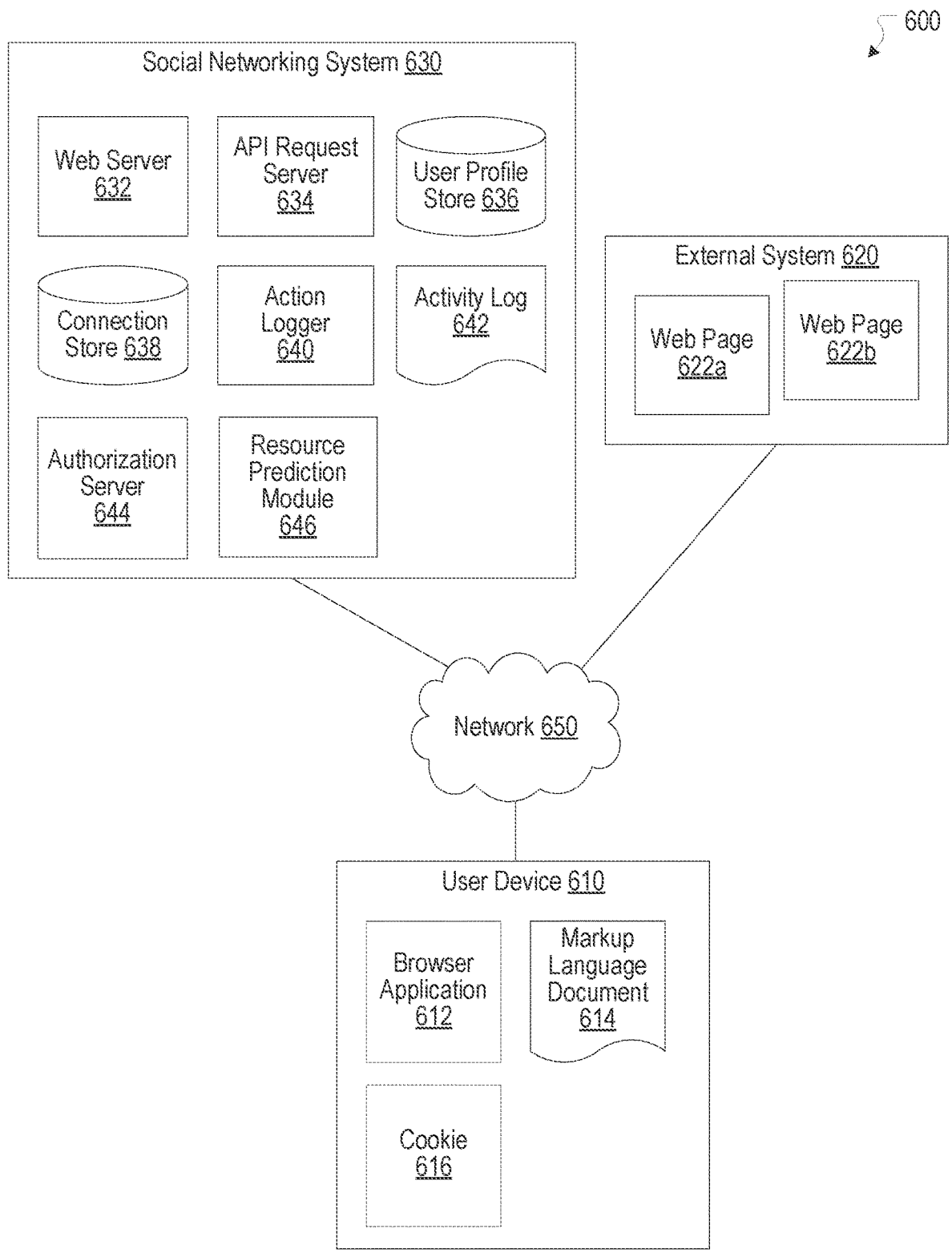
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a resource prediction module 646. The resource prediction module 646 can, for example, be implemented as the resource prediction module 102, as discussed in more detail herein. As discussed previously, it should be appreciated that there can be many variations or other possibilities. For example, in some embodiments, one or more functionalities of the resource prediction module 646 can be implemented in the user device 610.

Hardware Implementation

Figure 7:
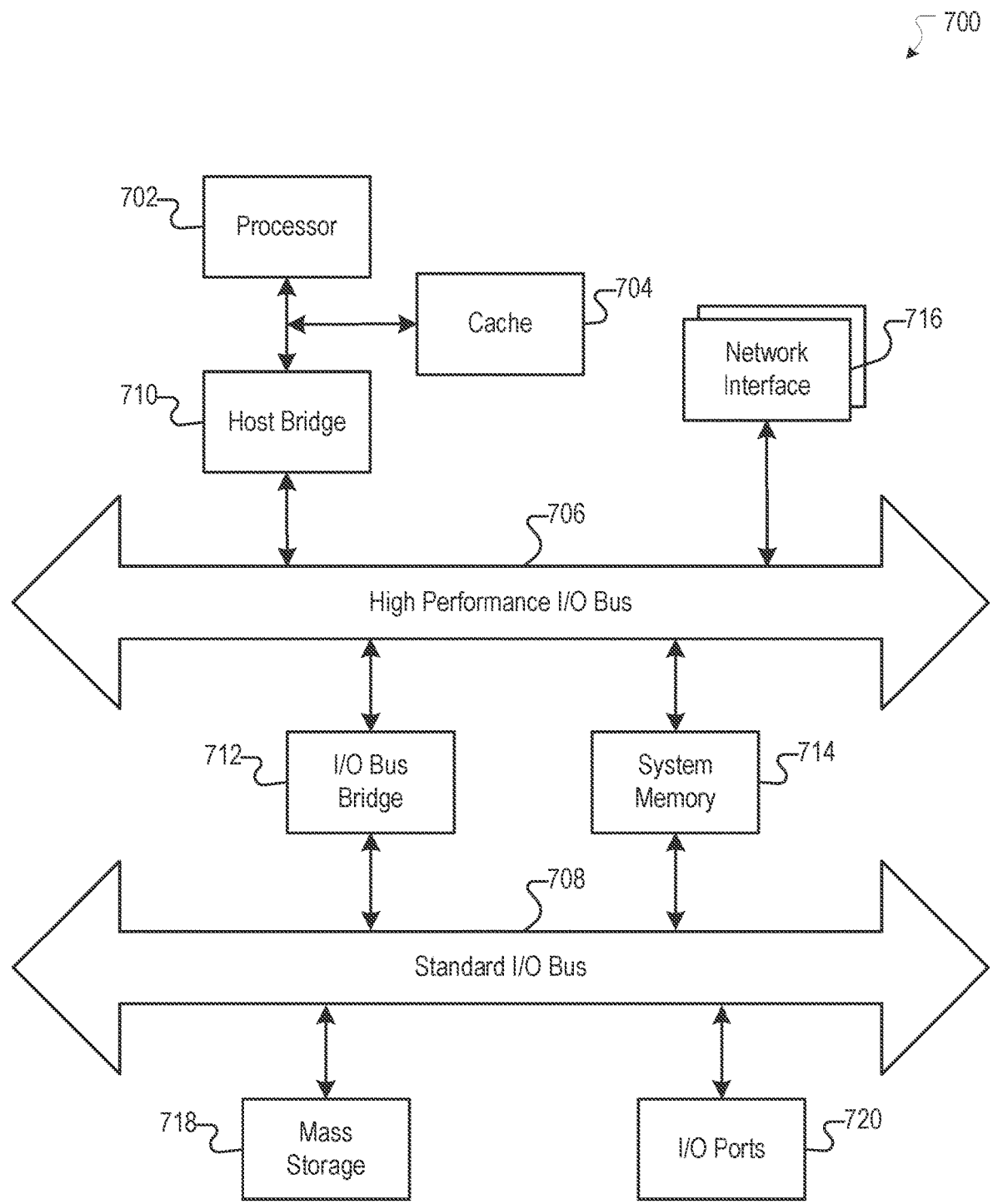
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a set of gatekeeper conditions based on a user ID associated with a web page request from a client computing device;
   determining, by the computing system, a set of predicted resources based on the set of gatekeeper conditions and a set of gatekeeper condition-resource associations that associate the set of predicted resources with the set of gatekeeper conditions;
   transmitting, by the computing system, an initial package of resources to the client computing device in response to the web page request, wherein the initial package of resources includes the set of predicted resources;
   receiving, by the computing system, a request for an additional resource from the client computing device;
   updating, by the computing system, the set of gatekeeper condition-resource associations based on the request, wherein the updating includes calculating a conditional probability that the additional resource will be requested given a particular gatekeeper condition and associating the additional resource with the particular gatekeeper condition; and
   transmitting, by the computing system, the additional resource to the client computing device in response to the request.

2. The method of claim 1, wherein the updating the set of gatekeeper condition-resource associations further includes incrementing a resource counter associated with the additional resource, wherein the resource counter indicates a number of times the additional resource was requested.

3. The method of claim 2, wherein the conditional probability is based on the resource counter associated with the additional resource divided by a total sum of resource counters.

4. The method of claim 2, wherein the updating the set of gatekeeper condition-resource associations further includes incrementing a gatekeeper condition counter associated with the particular gatekeeper condition, wherein the gatekeeper condition counter indicates a number of times the particular gatekeeper condition occurred across web page requests during a specified period of time.

5. The method of claim 4, wherein the conditional probability is based on the gatekeeper condition counter associated with the particular gatekeeper condition divided by the resource counter associated with the additional resource.

6. The method of claim 1, wherein the conditional probability is based on a first gatekeeper condition counter for passes associated with the particular gatekeeper condition divided by a sum of the first gatekeeper condition counter and a second gatekeeper condition counter for fails associated with the particular gatekeeper condition.

7. The method of claim 1, wherein the associating the additional resource with the particular gatekeeper condition is based on a determination that the conditional probability satisfies a conditional probability threshold.

8. The method of claim 1, wherein the particular gatekeeper condition is associated with a particular experiment that provides access to a particular feature to participants in the particular experiment.

9. The method of claim 1, wherein the conditional probability is periodically recalculated based on data from a specified period of time.

10. The method of claim 1, wherein the initial package of resources further includes a set of high frequency resources, wherein the set of high frequency resources are required by a web page associated with the web page request.

11. A system comprising:
at least one processor; and
a memory storing instructions that, when executed by the at least one processor, cause the system to perform:
determining a set of gatekeeper conditions based on a user ID associated with a web page request from a client computing device;
determining a set of predicted resources based on the set of gatekeeper conditions and a set of gatekeeper condition-resource associations that associate the set of predicted resources with the set of gatekeeper conditions;
transmitting an initial package of resources to the client computing device in response to the web page request, wherein the initial package of resources includes the set of predicted resources;
receiving a request for an additional resource from the client computing device;
updating the set of gatekeeper condition-resource associations based on the request, wherein the updating includes calculating a conditional probability that the additional resource will be requested given a particular gatekeeper condition and associating the additional resource with the particular gatekeeper condition; and
transmitting the additional resource to the client computing device in response to the request.

12. The system of claim 11, wherein the updating the set of gatekeeper condition-resource associations further includes incrementing a resource counter associated with the additional resource, wherein the resource counter indicates a number of times the additional resource was requested.

13. The system of claim 12, wherein the conditional probability is based on the resource counter associated with the additional resource divided by a total sum of resource counters.

14. The system of claim 12, wherein the updating the set of gatekeeper condition-resource associations further includes incrementing a gatekeeper condition counter associated with the particular gatekeeper condition, wherein the gatekeeper condition counter indicates a number of times the particular gatekeeper condition occurred across web page requests during a specified period of time.

15. The system of claim 14, wherein the conditional probability is based on the gatekeeper condition counter associated with the particular gatekeeper condition divided by the resource counter associated with the additional resource.

16. A non-transitory computer-readable storage medium including instructions that, when executed by at least on processor of a computing system, cause the computing system to perform:
determining a set of gatekeeper conditions based on a user ID associated with a web page request from a client computing device;
determining a set of predicted resources based on the set of gatekeeper conditions and a set of gatekeeper condition-resource associations that associate the set of predicted resources with the set of gatekeeper conditions;
transmitting an initial package of resources to the client computing device in response to the web page request, wherein the initial package of resources includes the set of predicted resources;
receiving a request for an additional resource from the client computing device;
updating the set of gatekeeper condition-resource associations based on the request, wherein the updating includes calculating a conditional probability that the additional resource will be requested given a particular gatekeeper condition and associating the additional resource with the particular gatekeeper condition; and
transmitting the additional resource to the client computing device in response to the request.

17. The non-transitory computer-readable storage medium of claim 16, wherein the updating the set of gatekeeper condition-resource associations further includes incrementing a resource counter associated with the additional resource, wherein the resource counter indicates a number of times the additional resource was requested.

18. The non-transitory computer-readable storage medium of claim 17, wherein the conditional probability is based on the resource counter associated with the additional resource divided by a total sum of resource counters.

19. The non-transitory computer-readable storage medium of claim 17, wherein the updating the set of gatekeeper condition-resource associations further includes incrementing a gatekeeper condition counter associated with the particular gatekeeper condition, wherein the gatekeeper condition counter indicates a number of times the particular gatekeeper condition occurred across web page requests during a specified period of time.

20. The non-transitory computer-readable storage medium of claim 19, wherein the conditional probability is based on the gatekeeper condition counter associated with the particular gatekeeper condition divided by the resource counter associated with the additional resource.

* * * * *